8249X

A. C. JONES.

Car Wheel.

Patented June 14, 1834.

N. PETERS, PHOTO-LITHOGRAPHER, WASHINGTON, D. C.

Alfred C. Jones of Philadelphia Pennsylva.

Letters Patent

The schedule referred to in these Letters Patent and making part of the same containing a description in the words of the said Alfred C. Jones himself, of his improvement in Locomotive Engines, Cars, and Carriages used upon Rail Roads.

To all whom it may concern—

Figure 1:
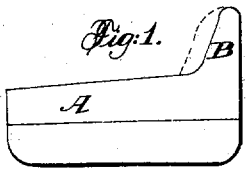

Be it known that I Alfred C. Jones of the City of Philadelphia in the state of Pennsylvania have invented certain improvements in Locomotive Engines, which improvements are in part applicable to other carriages and Cars, used upon railroads. and I do hereby declare the following, is a full and exact description of my said improvements reference being had to the drawing which accompanies this specification and makes part thereof. It is well known to those habituated to the use of such Machinery, that the iron tire, which forms the tread and flanch of Locomotive and other railroad Carriages, wears rapidly out, on the bearing of the flanch, ~~by its~~ by its friction against the rail, rendering it necessary in the course of a few months, to renew the tire at a very heavy cost. My first improvement consists, in a mode of obviating this dificulty, by the employment of what I denominate a false flanch, In figure 1. the part A. represents a cross section of that portion of the tire, which forms the tread and the part B. that which forms the flanch. The latter excluding the dotted line. exhibits a flanch as worn by a continued use of some months. the dotted lines showing Drawing

Figure 2:
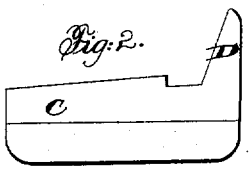
Figure 3:
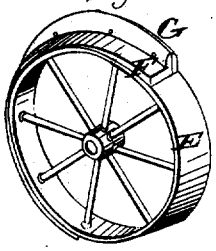
Figure 4:
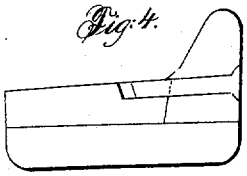
Figure 5:
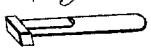
Figure 6:
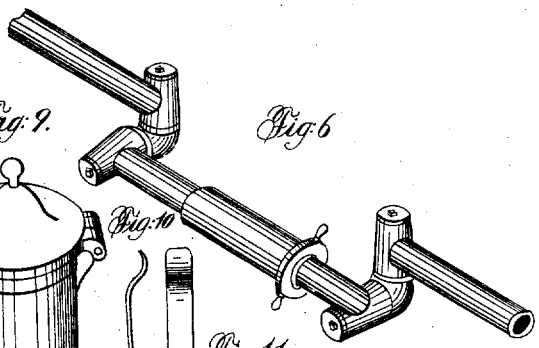

8249X showing the original form when this wearing has
taken place to an injurious extent, I take the wheel,
and turning it in a lathe. I turn the flanch part of the
tire in the manner shown at C.D. fig 2. to receive the
false flanch. making a shoulder in the tread of the
wheel, to hold it more firmly. Fig 3. shows a wheel,
surrounded in part by the tire. C. being the tire- F,
the tread of the tire, and by the false flanch, which
I generally confine in its place, by means of rivets pass-
ing through it, and the true flanch, having the holes
on each side, countersunk for that purpose. I intend
sometimes to make the flanch in one entire, separate
piece, and secure it to the tread by means of T. head-
ed bolts as shown in fig 4. one of the bolts being shown
at fig 5.- this bolt is to leave a recess in the tire, so as
to be flush with it. What I claim in this part of my
improvement, is the application of a false flanch, to
the tire or rail road wheels; for the purpose, and in the
manner, herein set forth, intending however to vary
the mode of proceedure in any way, which I may find
convenient, whilst the principle thereof remains
unchanged. My second improvement consists in
apparatus by which the water is supplied from the
cistern of the tender to the engine, which is usually
effected by means of leather, hemp, or other hose, instead
of those, I use apparatus, consisting of tubes, and joints
of Metal. one form in which I make this, is shown
in fig 6, which is a tube having socket joints at A B and
A B. fitted, together, conically so as to be water tight. The parts
A & B., being at right angles to each other, so as to move freely in all
directions, C is a sliding tube, to admit of the lengthening & shor-
tening of the apparatus, and applying it to the motion of the
Carriage. D. is a union joint by which the parts when necessary
may

Figure 7:
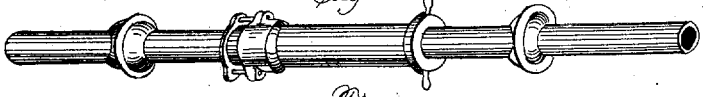
Figure 8:
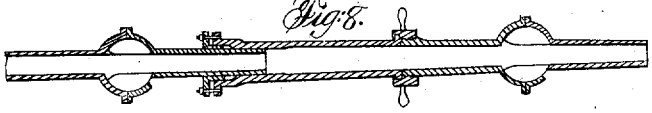

8249X.

may be detached from each other. Fig 7. is a similar appa
ratus, but with the ball, and socket Joints, substituted
for the last. Fig 8. is a section of the same similar posts
in each having the same letters of reference A.A, are the
balls. B.B, the sockets, C.C. the cap for keeping the balls in
their place. D.D. the sliding tube, which may if preferred
be furnished with a stuffing box. E. the place of the union
Joint. I do not in this part claim, to be the inventor of flex=
ible Metallic tubes, such as I have described. but
What I do claim, is their adaption to, and employment
in Locomotive Carriages & tenders; for the purpose of
supplying the engine with water.— my third improve=
ment is in the oil cup, or syphon which is used for
oiling the Machinery, and consists in the manner
of confining, the lid thereof, by means of a spring
instead of by sliding or securing as is most common=
ly done.

Figure 9:
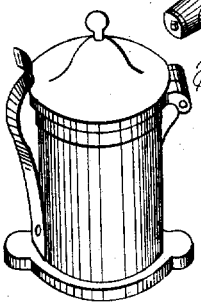
Figure 10:
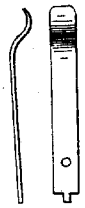
Figure 11:
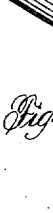

The general form which I give to the cup,
its lid and hinge is shown in fig 9. the improvement consists
in the application of a spring A. which is riveted or secured,
to the body of the cup, and is so bent at the top, as to bear on
the edge of the lid, and retain it in its place, fig 10 is the edge
and fig 11 the flat side of the spring. the application of which,
to such cups, I claim as my invention.

Witness
E. Bartram
John Wall.

Alfred C. Jones.

Exd.
M.G.C.

1044 wds]